United States Patent [19]
Volk

[11] Patent Number: 5,102,370
[45] Date of Patent: Apr. 7, 1992

[54] SNAP-ON POULTRY TRUSSING DEVICE

[76] Inventor: Henry J. Volk, 1863 Anning, Turlock, Calif. 95380

[21] Appl. No.: 723,444

[22] Filed: Jun. 27, 1991

[51] Int. Cl.⁵ .............................................. A27C 21/00
[52] U.S. Cl. ..................................... 452/174; 452/176
[58] Field of Search ................... 452/174, 176, 198, 11

[56] References Cited

U.S. PATENT DOCUMENTS

| | | | |
|---|---|---|---|
| 2,009,546 | 7/1935 | Fannen et al. | 452/11 |
| 2,583,913 | 1/1952 | Weiterschan | 452/174 |
| 3,213,487 | 10/1965 | Reynolds | 452/174 |
| 3,895,415 | 7/1975 | Volk | 452/174 |
| 4,051,573 | 10/1977 | Volk | 452/174 |
| 4,739,538 | 4/1988 | Volk | 452/174 |

Primary Examiner—Willis Little

[57] ABSTRACT

A snap-on poultry trussing device is provided having a pair of resilient sockets wherein each socket is expanded to pass over an exposed hock and then contracts to grasp an ankle. A connector is provided for joining the pair of resilient sockets.

3 Claims, 1 Drawing Sheet

U.S. Patent
Apr. 7, 1992
5,102,370
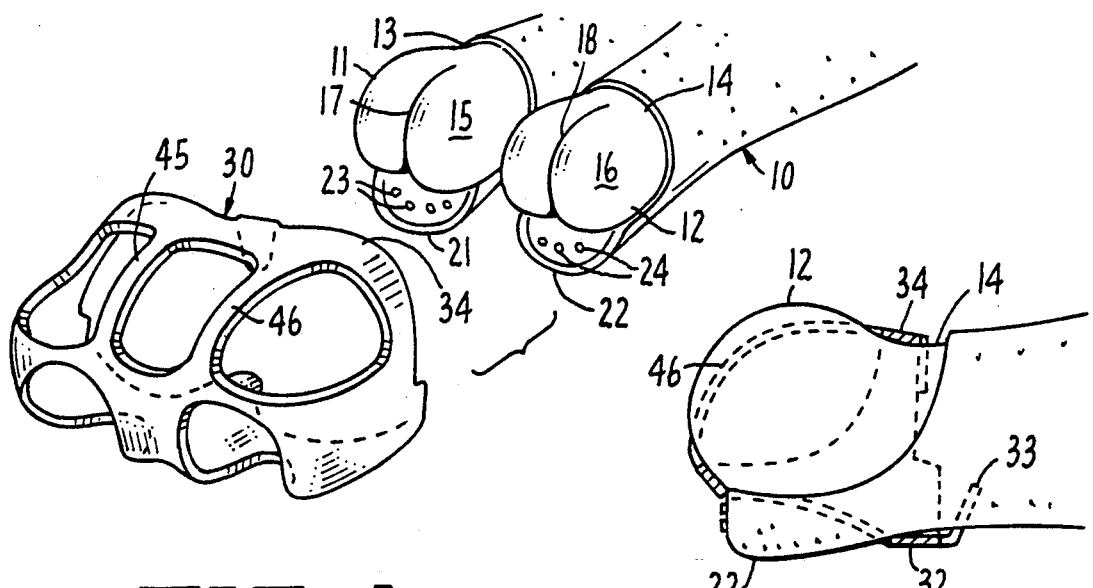
FIG.1.
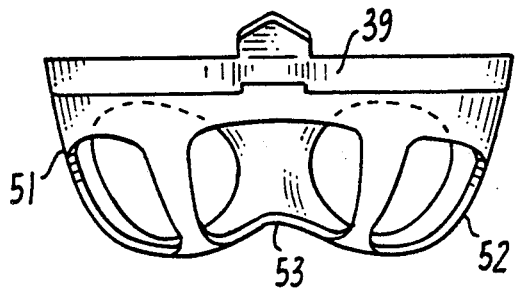
FIG.5.
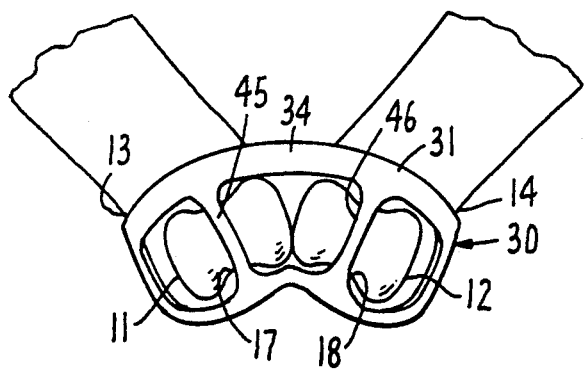
FIG.2.
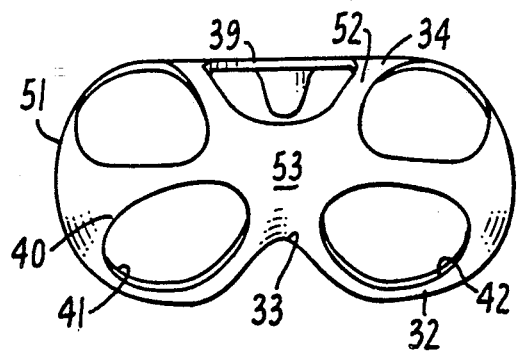
FIG.6.
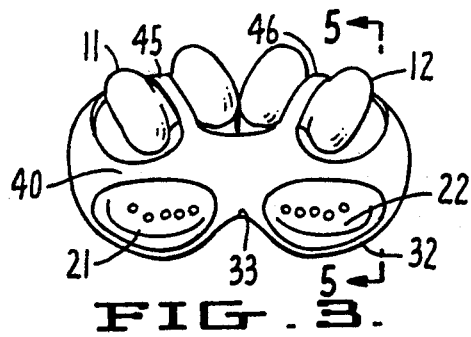
FIG.3.
FIG.7.
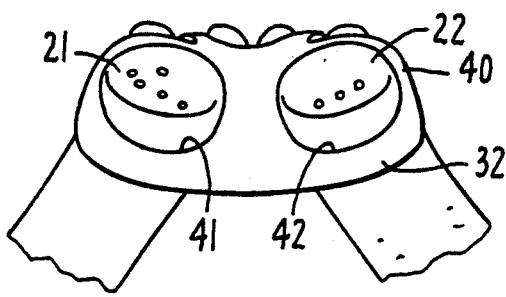
FIG.4.

SNAP-ON POULTRY TRUSSING DEVICE

SUMMARY OF THE INVENTION

This invention relates to poultry trussing devices in general. More particularly, the invention relates to a plastic "snap-on" trussing device designed primarily for turkeys, but which could be used with other poultry.

Prior art trussing devices include the wire device shown in U.S. Pat. No. 3,112,515. This prior art wire device is somewhat time consuming to apply to the carcass, and time consuming to remove from the carcass. The wire, itself, is somewhat corrosive and some of the basting ingredients used have adverse effects on the wire. The prior art also includes a plastic device shown in U.S. Pat. No. 4,056,865 which is somewhat similar to the wire device shown in U.S. Pat. No. 3,112,515 in that it has arms which are anchored inside the carcass of the turkey and a center portion which extends around the hocks and pulls the hocks downwardly toward the tail.

The present invention provides a plastic trussing device which may be more readily applied and more readily removed than prior art devices. The device is applied directly to the exposed hocks without the requirement of anchoring the device within the body of the poultry carcass.

It is a primary object of the invention to provide a "snap-on" poultry trussing device which may be readily applied to and removed from the exposed hocks of a poultry carcass.

A further object of the invention is to provide a poultry trussing device which is applied to the exposed hocks and which does not require anchoring to the body of the poultry carcass.

A further object of the invention is to provide a turkey trussing device which grasps the exposed hocks of the carcass and holds the hocks together by applying inward pressure to the ankles of the carcass.

Other objects and advantages of the invention will become apparent from the following description of the preferred embodiment and the drawings wherein:

BRIEF DESCRIPTION OF THE DRAWINGS

FIG. 1 is a perspective view showing a trussing device according to the present invention about to be applied to a pair of exposed hocks;

FIG. 2 is a top elevational view showing the trussing device of the present invention as applied to a turkey carcass;

FIG. 3 is a side elevational view of the device as applied to a turkey carcass;

FIG. 4 is a bottom view of a device as applied to a turkey;

FIG. 5 is a section on the line 5—5 of FIG. 3;

FIG. 6 is a side elevational view of the device before it is applied; and

FIG. 7 is a bottom elevational view of the device before it is applied.

DETAILED DESCRIPTION OF THE DRAWINGS

Referring to FIG. 1, the "snap-on" trussing device 30 is shown prior to be being applied to a poultry carcass 10. The carcass 10 has a pair of hocks 11 and 12 which extend from ankles 13 and 14, respectively. The hocks 11 and 12 have smooth bony surfaces 15 and 16 which extend in an upward direction and which have dimples 17 and 18 formed therein.

Hocks 11 and 12 also have knobs 21 and 22 which extend in a downward direction. Knobs 21 and 22 are the portion of the leg of the turkey through which tendons 23 and 24 extend. As shown best in FIG. 5, the hock 12 is somewhat larger in size than the ankle area 14.

As shown best in FIG. 1, the "snap-on" trussing device 30 of the present invention has an ankle strap 31 which is adapted to be slipped over said exposed hocks 11 and 12 and to engage the ankles 13 and 14 and to hold the hocks adjacent each other as shown in FIG. 2.

Ankle strap 31 has a lower portion 32, shown best in FIGS. 4 and 5, which engages the backside of the ankles, as shown best in FIG. 4. As shown best in FIG. 3, the lower portion 32 of ankle strap 31 has an indent 33 formed therein which extends upwardly between the ankles as shown best in FIG. 5.

Ankle strap 31 also has an upper portion 34, shown best in FIG. 2, which extends across the top of the exposed hocks 11 and 12.

As shown best in FIG. 4, the lower portion 32 of ankle strap 31 carries a generally FIG. 8 shaped retainer 40 which has a pair of oval shaped openings 41 and 42 formed therein. Openings 41 and 42 are of an appropriate size and shape to engage knobs 21 and 22 and hold the knobs in position as shown best in FIG. 4. In the embodiment shown in the drawings, the generally FIG. 8 shaped retainer 40 is integrally molded to the lower portion 32 of ankle strap 31.

A pair of secondary straps 45 and 46 is provided which extends from ankle strap 31, as shown in FIG. 2, to the generally FIG. 8 shaped retainer 40, as shown best in FIG. 3. Each secondary strap 45 and 46 is adapted to engage the dimpled portions 17 and 18 of hocks 11 and 12.

Referring to FIGS. 1 and 5, in applying the "snap-on" truss the upper portion 34 of ankle strap 31 is pulled upwardly to slip over hock 12 and is then allowed to resiliently grasp ankle 14. When applied, knobs 21 and 22 become seated in openings 41 and 42 and ankle strap 31 resiliently engages ankles 13 and 14 and holds hocks 11 and 12 adjacent each other, as shown in FIG. 2. Secondary straps 45 and 46 provide additional gripping force between the trussing device 30 and the hocks 11 and 12.

Referring to FIGS. 6 and 7, it can be seen that the present invention provides a pair of resilient socket means 51 and 52, wherein socket means 51 contains those portions of the apparatus which engage and hold hock 11 and socket means 52 includes those portions of the device which engage and hold hock 12. As shown best in FIG. 7, socket means 51 and socket means 52 are connected by connecting means 53 which comprises the indented portion of ankle strap 31 and the central area 39 of the upper portion 34 of ankle strap 31. Each of resilient socket means 51 and 52 is expanded to pass over an exposed hock 12, as shown in FIG. 5, and then each of said resilient sockets contracts to grasp an ankle 13 or 14. Connecting means 53 is sized so that the sockets 51 and 52 hold the exposed hocks adjacent to each other as shown in FIG. 2.

I claim:
1. A poultry trussing device for use in conjunction with a poultry carcass to hold the legs of said carcass in a position wherein the hocks are adjacent each other and near the tail of the carcass, wherein the hocks are exposed and wherein each hock extends from an ankle and has a smooth, dimpled bony surface extending in an upward direction and a knob extending in a downward direction, said trussing device comprising:

an ankle strap adapted to be slipped over said exposed hocks and to e-gage the ankle of each leg and to hold said hocks adjacent each other, said ankle strap having a lower portion which engages the back side of said ankles, said lower portion having an indent formed therein which extends upwardly between said ankles, and a generally FIG. 8 shaped retainer carried by said ankle strap, adapted to engage said knobs and hold said knobs in position.

2. The device of claim 1 further comprising:
a pair of secondary straps, each extending from said ankle strap to said FIG. 8 shaped retainer, wherein each secondary strap is adapted to engage the dimpled portion of a hock.

3. A poultry trussing device for use in conjunction with a poultry carcass which has the hocks exposed, and wherein each hock extends from an ankle, comprising:

a pair of resilient socket means, wherein each socket means is expanded to pass over an exposed hock and then contracts to grasp an ankle, and connecting means for joining said pair of resilient socket means.

* * * * *